United States Patent
Dice et al.

(10) Patent No.: US 6,308,315 B1
(45) Date of Patent: Oct. 23, 2001

(54) SYSTEM AND METHOD FOR AUTOMATICALLY AND SELECTIVELY PROMOTING OBJECT VARIABLES TO METHOD FIELDS AND VARIABLES IN A DIGITAL COMPUTER SYSTEM

(75) Inventors: David Dice, Foxboro; Andrew F. Herrick, Hopkinton; Ronald J. Mann, Concord, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/172,153

(22) Filed: Oct. 14, 1998

(51) Int. Cl.[7] ........................................................ G06F 9/45
(52) U.S. Cl. ........................................ 717/2; 717/3; 717/5
(58) Field of Search ................................. 717/2, 3, 4, 5; 345/326, 327

(56) References Cited

U.S. PATENT DOCUMENTS

| | | | |
|---|---|---|---|
| 5,898,850 | * 4/1999 | Dickol et al. | 712/229 |
| 5,898,885 | * 4/1999 | Dickol et al. | 712/36 |
| 5,905,895 | * 5/1999 | Halter | 717/9 |
| 5,907,707 | * 5/1999 | Ramalingam et al. | 717/1 |
| 5,913,065 | * 6/1999 | Faustini | 717/3 |
| 5,943,496 | * 8/1999 | Li et al. | 709/328 |
| 5,974,256 | * 10/1999 | Matthews et al. | 717/5 |
| 6,011,918 | * 1/2000 | Cohen et al. | 717/3 |
| 6,070,010 | * 5/2000 | Keenleyside et al. | 717/5 |
| 6,074,432 | * 6/2000 | Guccione | 717/2 |
| 6,075,942 | * 6/2000 | Cartwright, Jr. | 717/9 |
| 6,081,665 | * 6/2000 | Nilsen et al. | 717/5 |
| 6,106,571 | * 8/2000 | Maxwell | 717/4 |
| 6,131,187 | * 10/2000 | Chow et al. | 717/5 |
| 6,141,794 | * 10/2000 | Dice et al. | 717/5 |
| 6,151,703 | * 11/2000 | Crelier | 717/5 |
| 6,158,048 | * 12/2000 | Lueh et al. | 717/9 |
| 6,182,274 | * 1/2001 | Lau | 717/1 |

OTHER PUBLICATIONS

Ishizaki et al, "design implemenation and evaluation of optimizations in Just in compiler", JAVA ACM, pp. 119–128, May 1999.*
Chao et al, "Interfacing Java to the virtual interface architecture", JAVA ACM, pp. 51–57, May 1999.*
Newhall et al, "Performance measurement of dynamically compiled Java execution", JAVA ACM, pp. 42–50, May 1999.*
Benton et al, "Compiling standard ML to Java bytecode", ACM ICFP, pp. 129–140, Apr. 1998.*
Steensgaard et al., "Object and native code thread mobility among heterogenous computers", ACM SIGOPS, pp. 68–78, Apr. 1995.*
Azevedo et al, "Java annotation aware just in time (AJIT) compilation system", ACM JAVA, pp. 142–152, May 1999.*

* cited by examiner

*Primary Examiner*—Kakali Chaki
*Assistant Examiner*—Anil Khatri (57) ABSTRACT

A code generating system generates, from code in a program, native code that is executable by a computer system. The computer system includes a memory subsystem including a heap in which objects are stored and a stack in which method variables are stored. The code generating system may be included in a just-in-time compiler used to generate native code that is executable by a computer system, from a program in Java Byte Code form, and specifically determines, in response to Java Byte Code representative of an operator for enabling instantiation of a new object, whether the object to be instantiated contains a variable to be used in processing of the received program code portion which can be promoted to a method variable, and, if so, generates native code to enable said variable to be instantiated on the stack.

21 Claims, 4 Drawing Sheets

SYSTEM AND METHOD FOR AUTOMATICALLY AND SELECTIVELY PROMOTING OBJECT VARIABLES TO METHOD FIELDS AND VARIABLES IN A DIGITAL COMPUTER SYSTEM

FIELD OF THE INVENTION

The invention relates generally to the field of digital computer systems, and more particularly to systems and methods for automatically and selectively promoting object variables to method fields or variables in a digital computer system.

BACKGROUND OF THE INVENTION

The Java programming language has been developed to facilitate the development of programs that can be executed on a wide variety of computers, independent of the computers' particular system or processor architecture. The Java programming language is generally object-oriented, and a program developer generates a Java program in the form of one or more classes. A Java compiler ("javac") compiles the program into Java byte code ("JBC") for distribution. When the Java program is to be executed on a computer, the Java bye code can be executed in an interpretive manner by a Java "virtual machine" which is provided on the computer. Alternatively, the Java byte code can be compiled to the native instruction code of the computer on which the Java program is to be executed by, for example, a "just-in-time" ("JIT") compiler. The just-in-time compiler provides the compiled code to the Java virtual machine for execution. In processing the Java program, the Java virtual machine provides a number of services, including interfacing with the computer's operating system to, for example, obtain data ("input") for processing and provide processed data ("output") for storage, display to an operator and so forth. The Java programming language generally lacks the "struct" ("structure") concept. In programming languages such as "C", the structure concept allows a programmer to define a new data type comprising a collection of one or more variables identified by a data type identifier. After the structure has been defined, the programmer can easily establish, or "declare" a new variable having the data type's structure by referencing the identifier for the structure in the variable's declaration. As is conventional, a program (more specifically, a process or thread) has memory structures including one or more stacks and a heap in which data can be stored, and in programming languages such as "C" the programmer can declare the new variable to be established on a stack or allocate space for it in the program's heap. While programming languages such as "C" provides for a significant degree of flexibility to a programmer, a problem can arise, most particularly if the variable is established in the heap, as follows. If a variable has been declared and used in a program, and if space for it has been allocated on the heap, the programmer will generally need to deallocate the space if the variable is not going to be used thereafter, otherwise the space will continue to be allocated for the variable, which can reduce the space available for variable which are declared subsequently during processing of the program.

As noted above, the Java programming language lacks the concept of a "structure." In Java, in order to achieve a similar effect as that provided by a "structure" in "C," a Java programmer must resort to usage of a degenerate class that contains fields, but no methods. A Java program may use a degenerate class, which is also referred to as a "degenerate container class," by enabling an object to be created therefor by use of a "new" operator. An example of the use of the "new" operator will be clear from Code Segments 1A and 1B Code Segment 1A

```
class aPoint {                          //degenerate class
   int x ;
   int y ;
   int zplane ;
   public void scale ( int Factor)      //method to scale this.x and this.y
   {
      this.x *= Factor ;
      this.y *= Factor ;
   }
   public void add ( int x, int y )     //method to increment this.x and
                                        this.y
   {
      this.x += x ;
      this.y += y ;
   }
}
```
Code Segment 1B

```
class body {
   public int UsePoint ( int x, int y, int Q)
   {
      int temp, dist ;
      aPoint pt = new aPoint () ;        //object "pt" created using aPoint
      tmp = (x < y) ? x : y ;
      pt.x = x - 5 ;                     //translate
      pt.y = y - 10 ;
      if (tmp < 100) {
         pt.x *= 2 ;                     //scale
         pt.y *= 2 ;
      }
      dist = (int) Math.sqrt ( (double) (pt.x * pt.x) +
      (double) (pt.y * pt.y) ) ;
      if (tmp < 0) {
         dist = –dist ;
      }
      return dist ;
   }
}
```

In Code Segment 1A, a degenerate container class aPoint is defined, which is used in Code Segment 1B. The degenerate container class aPoint defines variables aPoint.x, aPoint.y and aPoint.zplane and two methods, namely, a method Scale and a method add. In Code Segment 1B, a class "body" is defined having a single method body.UsePoint which makes use of the degenerate container class aPoint to define a new variable "pt" having components aPoint.x (established as pt.x) and aPoint.y (established as pt.y). In the method body.UsePoint, various operations to be performed in connection with the variable "pt," including translation, conditional scaling and distance determination, and provides a single return value "dist." During execution, in response to the "new" operator in method body.UsePoint, a new object for the degenerate container class aPoint is established on the heap for the program which is using body.UsePoint. The variable aPoint.zplane in the degenerate container class aPoint is not used in body.UsePoint, but it would be instantiated as part of the object aPoint in response to the "new" operator in body.UsePoint.

Several problems arise in connection with object variables, such as that described above in connection with aPoint, which are established on the heap. First, the object includes not only room for the aPoint variables, but also object header information, which can require a fairly extensive amount of storage. In addition, as noted above, in programming languages such as "C," the programmer explicitly deallocates space on the heap that is allocated to variable which will no longer be needed. Such explicit deallocation is not performed in connection with programs written in the Java programming language. Instead, the Java virtual machine contains a "garbage collection" mechanism which monitors the usage of variables and other objects for which space is allocated in the heap and, if it determines that an object is not likely to be used in the future, it will deallocate the space automatically. Garbage collection is not needed in connection with variables, termed "method variables" or "method fields," which are allocated on the stack, since, when the method which uses the variables returns, the entire portion of the stack (the "stack frame") used during execution of the method, which will include the variables which were used during the execution of the method, will automatically be eliminated without requiring intervention of the garbage collection mechanism. However, in Java, only simple field variables, such as method variables may be allocated on the stack, not composite types such as structures available in "C". Garbage collection requires use of the computer's processor, which takes resources that it (that is, the processor) might otherwise devote to other operations, and typically the larger the heap, the more resources the processor will need to devote to garbage collection. In addition, as suggested above, the object variables that are declared in a degenerate container class will be instantiated as part of an object even if they are not used in the method for which the object is instantiated, which can waste storage space in the heap.

SUMMARY OF THE INVENTION

The invention provides a new and improved system and method for automatically and selectively promoting object variables to method fields or variables in a digital computer system.

In brief summary, the invention provides a code generating system for generating, from code in a program, native code that is executable by a computer system. The computer system includes a memory subsystem including a heap in which objects are stored and a stack in which method variables are stored. The code generating system may be included in a just-in-time compiler used to generate native code that is executable by a computer system, from a program in Java Byte Code form, and specifically determines, in response to Java Byte Code representative of an operator for enabling instantiation of a new object, whether the object to be instantiated contains a variable to be used in processing of the received program code portion which can be promoted to a method variable, and, if so, generates native code to enable said variable to be instantiated on the stack.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
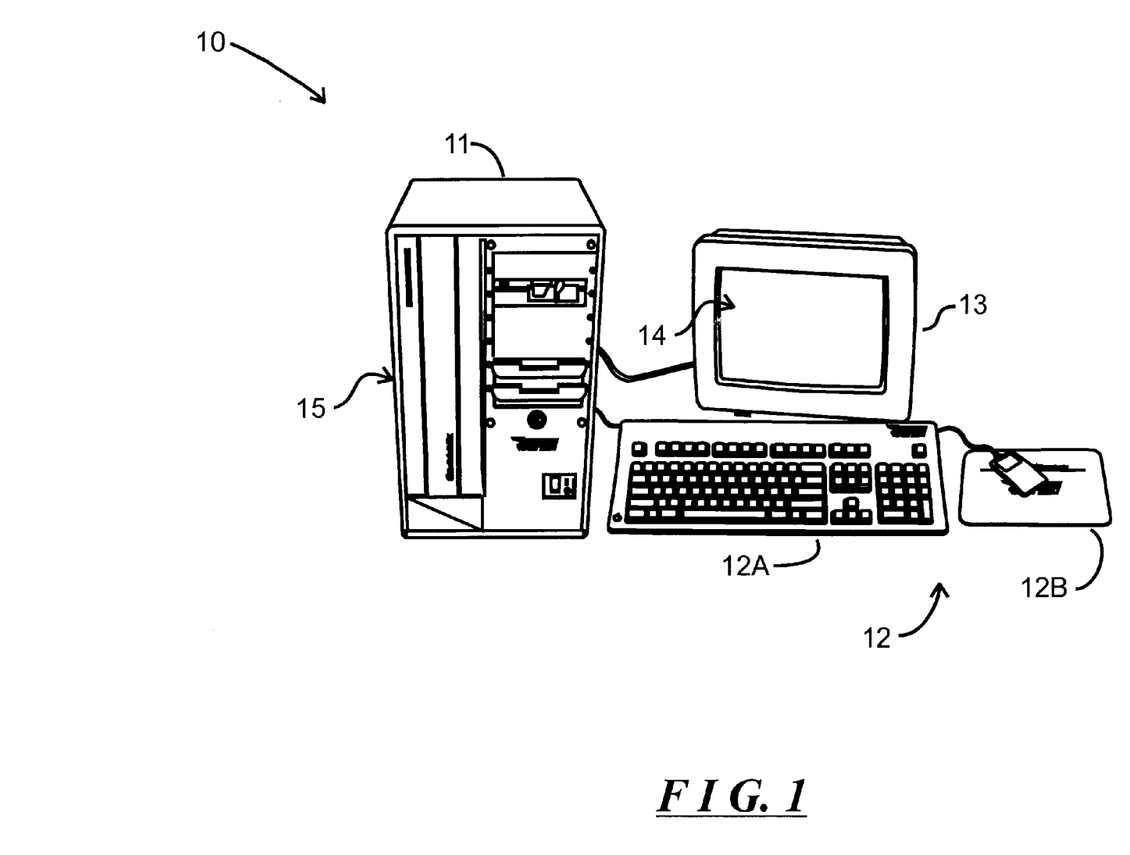
FIG. 1 depicts an illustrative digital computer system including an arrangement for automatically and selectively promoting object variables to method fields or variables in a digital computer system, constructed in accordance with the invention.

FIG. 1 depicts an illustrative computer system 10 including an arrangement for automatically and selectively promoting object variables to method fields or variables in a digital computer system, constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and operator output components such as a video display device 13 with integral speakers 15. The illustrative computer system 10 is of the conventional stored-program computer architecture.

The processor module 11 includes, for example, processor, memory and mass storage devices such as disk and/or tape storage elements (not separately shown) which perform processing and storage operations in connection with digital data provided thereto. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the processor, information stored in the mass storage subsystems may be transferred to the memory for storage. After the information is stored in the memory, the processor may retrieve it from the memory for processing. After the processed data is generated, the processor may also enable the mass storage subsystems to retrieve the processed data from the memory for relatively long-term storage.

The operator input element(s) 12 are provided to permit an operator to input information for processing and/or control of the digital computer system 10. The video display device 13 and speakers 15 are provided to, respectively, display visual output information on a screen 14, and audio output information, which are generated by the processor module 11, which may include data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 may include one or more network or communication ports, generally identified by reference numeral 15, which can be connected to communication links to connect the computer system 10 in a computer network, or to other computer systems (not shown) over, for example, the public telephony system. The ports enable the computer system 10 to transmit information to, and receive information from, other computer systems and other devices in the network.

Figure 2:
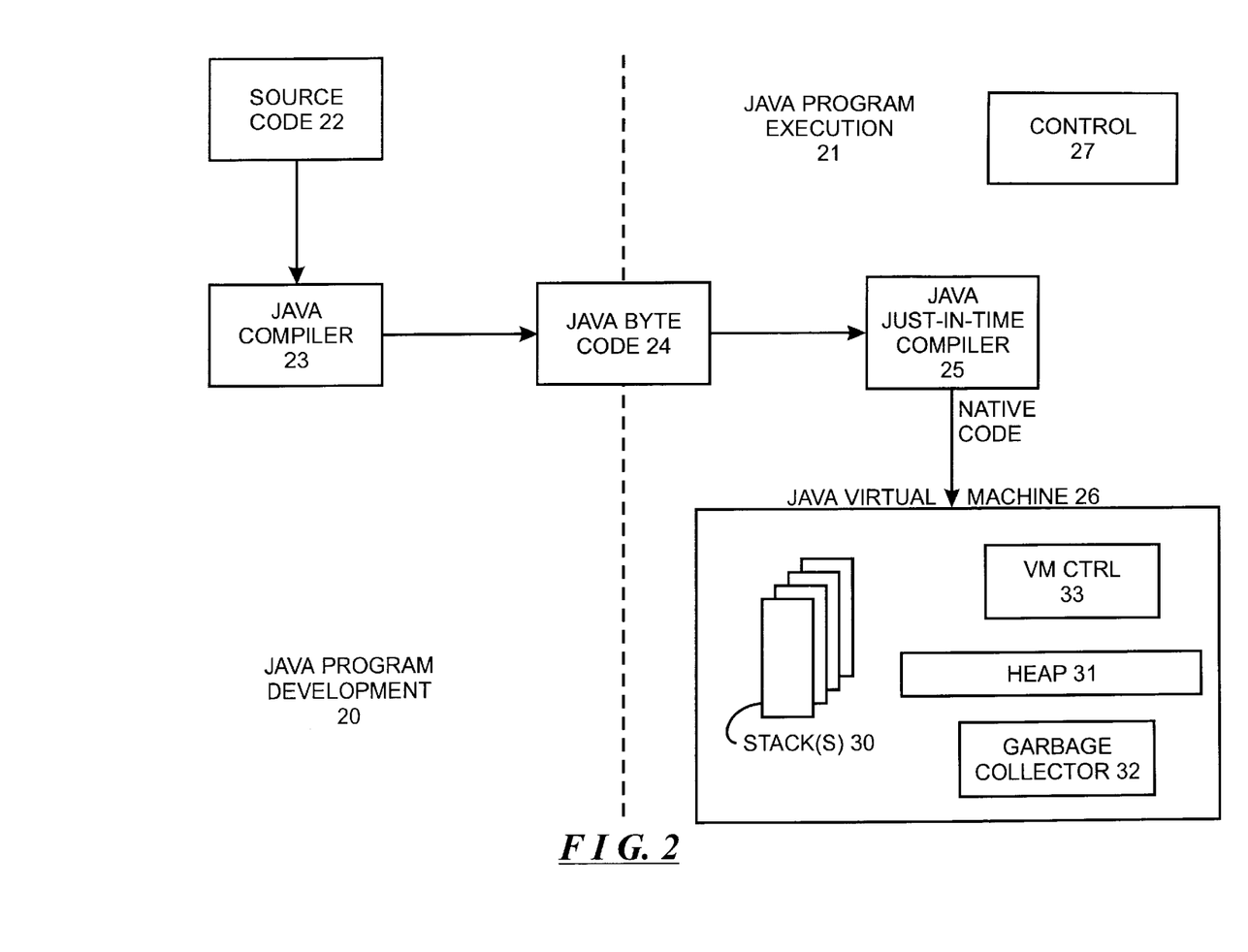
FIG. 2 is a functional block diagram of an arrangement constructed in accordance with the invention.

The invention provides an arrangement, which will be described below in connection with FIG. 2, for automatically and selectively promoting object variables to method fields or variables in a digital computer system. With reference to FIG. 2, the arrangement makes use of two general portions, including a Java program development portion 20 and a Java program execution portion 21. Generally, the Java program development portion 20 includes elements that a Java program developer uses to develop a program for distribution, and the Java program execution portion 21 includes elements that enable the Java program to be executed. The Java program development portion 20 and the Java program execution portion 21 may both form part of the same computer system, such as computer system 10. Alternatively, the Java program development portion 20 and the Java program execution portion 21 can form part of separate computer systems, and the Java program developed on one computer system (that is, the computer system including the Java program development portion 20) can be provided to the computer system on which the Java program is to be executed (that is, the computer system that includes the Java program execution portion 21) using any conventional mechanism suitable for distributing Java programs, including, for example, magnetic or optical disks, transfers over networks such as the Internet or the like.

More specifically, the Java program development portion 20 includes elements that a Java program developer uses to generate a Java program in a form that can be distributed, including, for example, elements of the computer system as described above that enable the input of information to the computer, the information that is input being in the form of Java program source code 22. The Java program source code 22 input by the program developer is, in turn, compiled by a Java compiler ("javac") 23 to generate Java byte code ("JBC") 24, which can be distributed as described above for execution.

The Java program execution portion 21 includes elements that enable the Java byte code 24 to be executed by the computer system 10. The Java program execution portion includes a Java-just-in-time ("JIT") compiler 25 and a Java virtual machine 26, both of which operate under control of a control module 27. The control module 27 may include, for example, elements of the operating system (not separately shown) which controls the computer system 10. The Java just-in-time compiler 25 receives the Java bye code 24 and generates therefrom native code for the computer system 10, which is provided to the Java virtual machine 26 for execution. The Java just-in-time compiler 25 generally generates the native code in a conventional manner, except as described below. The Java virtual machine includes a number of elements, including one or more stacks generally identified by reference numeral 30, a heap 31, a garbage collector and a virtual machine control module 33. The virtual machine control module 33 essentially controls the execution of the native code provided to the Java virtual machine 26 by the Java just-in-time compiler 26. In that process, the virtual machine control module 33 controls the establishment of the stack(s) 30 and the creation of method variables on the respective stacks, and in addition controls the creation of object variables on the heap 31. Generally, the Java programming language provides for execution of multiple threads of execution within the single Java virtual machine 26, and one stack 30 will be associated with one thread.

As is conventional, each stack 30 includes a series of storage locations, and the virtual machine control module 33 can push variables onto, and pop variables off of, the respective stack in response to instructions therefor in the native code received from the Java just-in-time compiler 25. The variables that are pushed onto a respective stack 30 may be popped off the stack for processing, also in accordance with native code instructions received from the Java just-in-time compiler 25, and the results may be pushed back onto the respective stack or stored elsewhere, such as in the heap 31. Generally, the instructions in the native code enable method variables, that is, variables that are declared and used in connection with a particular method, and not referenced by or used in other methods, to be pushed onto a respective stack 30. The portion of the stack onto which a variable or variables are pushed for a respective method is typically referred to as the method's stack frame. When processing of the method is completed and it "returns" to the method which called it, if any, the method's method variables are removed from the respective stack 30.

More specifically in connection with removal of a method's method variables from the respective stack 30, as is conventional each stack 30 is provided with a stack pointer that identifies the next storage location in the stack into which a variable may be stored. When processing of the method is completed and the method returns, the stack pointer is reset to identify the first storage location in the respective stack 30 that was used for the returning method's stack frame, in which case, when method variables are pushed onto the respective stack 30 for another method, the method variables are stored in storage locations that had been used for the previous method. Thus, when a processing of a method is completed and the method returns, the virtual machine control module 33 need not actually remove or over-write the storage location(s) in the respective stack 30 in which the method's method variable(s) is (are) stored.

As is further conventional, the heap 31 includes a plurality of storage locations in which the virtual machine control module 33 can store objects including object variables. Each object as stored in the heap 31 includes an object header and space for one or more variables associated with the respective object. The objects that are stored on the heap 31 may be retrieved therefrom for processing, also in accordance with native code instructions received from the Java just-in-time compiler 25, and the results may be stored in the same or other object on the heap 31 or elsewhere, such as pushed onto a stack 30. Generally, the instructions in the native code enable objects to be established in the heap 31 if they may be used in connection not only with the particular method in which they are declared, but also if they may be referenced by or used in other methods. When processing of the method in connection with which an object is declared is completed and the "returns" to the method which called it, if any, the object and its variables will remain on the heap 31. The garbage collector 32 is provided to scan the heap 31 to identify objects which are on the heap and will not be used subsequently, and to remove them from the heap 31 thereby to free the storage locations used thereby. After the storage locations have been freed, they may be used for other objects.

As noted above, conventionally the Java just-in-time compiler 25, in response to Java byte code enabling instantiation of an object, generates native code that enables space to be allocated in the heap 31 for the object and its variables and other information relevant thereto, including the object header. In accordance with the invention, the Java just-in-time compiler 25, in response to Java byte code enabling instantiation of an object, makes determinations in connection with certain characteristics in connection with the object, and, based on those determinations, selectively generates either (i) native code that enables space to be allocated in the heap 31 for the object and its variables and other information relevant thereto, including the object header, or (ii) native code that enables the object's variables to be pushed onto a respective stack 30.

If the Java just-in-time compiler 25 determines that native code is to be generated to enable space for the object to be created on the heap 31 (reference item (i) above), operations in connection with the object will proceed in a conventional manner, including allocation of the space on the heap 31 by the virtual machine control module 33, processing of the object's variables, and processing of the object by the garbage collector 32 to determine whether it (that is, the object) is to be removed and to free the storage locations in the heap 31 occupied by the object. However, if the Java-just-in-time compiler 25 determines that native code is to be generated to push the object's variables onto a stack 30 (reference item (ii) above), the virtual machine control module 33 will push the variables onto the respective stack 30 from which they are available for processing in connection with instructions related to the method for which the respective variables were pushed onto the stack. Since the object variables were created on the respective stack 30, instead of on the heap 31, when the processing of the method is completed and the method returns, the object variables will be removed from the respective stack 30 as described above, without requiring use of the garbage collector 32. Thus, by pushing the object variables onto the respective stack 30, instead of instantiating them in the heap 31, the load on the garbage collector 32 can be reduced. In addition, since the object variables on the respective stack 30 do not require the object header, the amount of storage required therefor will be reduced.

As noted above, the Java just-in-time compiler 25, selectively generates native code for enabling space to be allocated on the heap 31 for an object and its variables, or for enabling an object's variables to be pushed on the respective stack 30, after making determinations in connection with certain characteristics in connection with the object. In one embodiment, the determinations made by the Java just-in-time compiler 25 include, for example (a) determining whether the lifetime of the object to be instantiated is shorter than the lifetime of the method for which the object is to be instantiated; that is, the object must not persist after processing of the method has completed and the method returns;

(b) as an extension of item (a) above, determining whether the "new" operator that enables instantiation of the object can be executed an indeterminate number of times, which may occur if, for example, the "new" operator is in a loop for which the number of iterations is indeterminate when the Java just-in-time compiler 25 generates native code therefore; if the "new" operator can be executed an indeterminate number of times, the Java just-in-time compiler 25 generally will not be able to determine the lifetime of the instantiated objects; and (c) determining whether the method for which the object is instantiated stores a reference to the instantiated object in any storage location except a storage location appropriate for a method variable, that is, in any storage location other than the method's stack frame in the respective stack 30; otherwise stated, the Java just-in-time compiler determines whether the object may be visible in any way to any method other that the method for which the object has been instantiated.

The method for which the object is instantiated may store a reference to the instantiated object in a storage location which is not appropriate for a method variable (reference item (c) above) if, for example, it (that is, the method)

(I) returns a reference to the object, (II) passes a reference to the object to another method invocation as an argument, or (III) stores a reference to the object in a global location (such as in the heap 31) or adds it to a linked list that is rooted in a global location.

Thus, item (c) is provided to avoid "in-pointers," that is, pointers that refer to the object in storage locations which are accessible by methods other than the method for which the object was instantiated, which would point to storage locations, such as those in the stack frame for the method for which the object was instantiated, which will be removed when that method returns. Such "inpointers" may confuse the garbage collector 32, since, if the method returns the in-pointers will be stale and can result in potentially fatal memory corruption.

With respect to determinations made in items (a) through (c) above, (A) if the Java just-in-time compiler 25 makes a negative determination in connection with item (a) above (that is, if it determines that the lifetime of the object to be instantiated is longer than the lifetime of the method for which the object is to be instantiated), a positive determination in connection with item (b) above (that is, if it determines that the "new" operator that enables instantiation of the object can be executed an indeterminate number of times), or a positive determination in connection with item (c) above (that is, if it determines that the method for which the object is instantiated does store a reference to the instantiated object in any storage location except a storage location appropriate for a method variable), then it will generate native code that enables space to be allocated in the heap 31 for the object and its variables and other information relevant thereto, including the object header; but (B) if the Java just-in-time compiler 25 makes a positive determination in connection with item (a) above (that is, if it determines that the lifetime of the object to be instantiated is shorter than the lifetime of the method for which the object is to be instantiated), a negative determination in connection with item (b) above (that is, if it determines that the "new" operator that enables instantiation of the object will not be executed an indeterminate number of times), and a negative determination in connection with item (c) above (that is, if it determines that the method for which the object is instantiated does not store a reference to the instantiated object in any storage location except a storage location appropriate for a method variable), then it can generate native code that enables the object's variables to be pushed onto a respective stack 30.

For condition (A) above, the native code instructions generated by the Java-just-in-time compiler 25 will need to enable the object to be instantiated on the heap because the object may be referenced by at least one method other than the method for which the object is instantiated. This follows because the object may persist after the method for which the object is instantiated returns (item (a) above) or the lifetime of the object cannot be determined by the Java-just-in-time compiler 25 (item (b) above), or because the method for which the object is instantiated stores a reference to the object in a storage location which is not appropriate for the method's method variables (item (c) above). On the other hand, for condition (B) above, the above, the native code instructions generated by the Java-just-in-time compiler 25 may enable the object variables to be pushed on the respective stack 30 because the object will not be referenced by any method other than the method for which the object is instantiated. This follows because the lifetime of the object can be determined by the Java just-in-time compiler 25 (item (b) above) and the object will not persist after the method for which the object is instantiated returns (item (a) above), and further because the method for which the object is instantiated does not store a reference to the object in a storage location which is not appropriate for the method's method variables (item (c) above).

An illustrative example of native code generated by the Java just-in-time compiler 25 in connection with the invention will be described in connection with Code Segment 2.

---

Code Segment 2

```
public int UsePoint ( int x, int y, int Q )
{
    int tmp, dist ;
    int pt_x; int pt_y    //transformed version pt.x → pt_x, pt.y → pt_y
    tmp = (x < y) ? x : y
    pt_x = x - 5 ;         //translate
    pt_y = y - 10 ;
    if (tmp < 100) {
           pt_x *= 2 ;     //scale
           pt_y *= 2 ;
    }
    dist = (int) Math.sqrt ( (double) (pt_x * pt_x) +
           (double) (pt_y * pt_y) ) ;
    if (tmp < 0) {
        dist = -dist ;
    }
    return dist ;
}
```

---

Code Segment 2 depicts code, in the form of source code in the Java programming language, that is, in turn, representative of the native code that would be generated for both Code Segments 1A and 1B above if the Java just-in-time compiler 25 determines that the variables pt.x and pt.y of the object aPoint.x and aPoint.y can be treated as method variables instead of object variables (as in Code Segment 1B). The difference between Code Segment 2, on the one hand, and Code Segments IA and 1B, on the other hand, is that, while the variables pt.x and pt.y in Code Segment 1B are object variables, which would be instantiated in the heap 31, the variables pt_x and pt_y, used in Code Segment 2 would be, like method variables, on a stack 30. Since no object is instantiated in the heap 31 for the respective variables, as would be the case with Code Segments 1A and 1B, the variables can be more efficiently stored since (1) no object header is required and (2) variables which are not used in the method will not be assigned storage locations. In addition, the garbage collector 32 will not need to operate in connection therewith to free the storage locations which are allocated to the respective variables, since the storage locations will be recovered from the respective stack 30 when the method returns.

Figure 3:
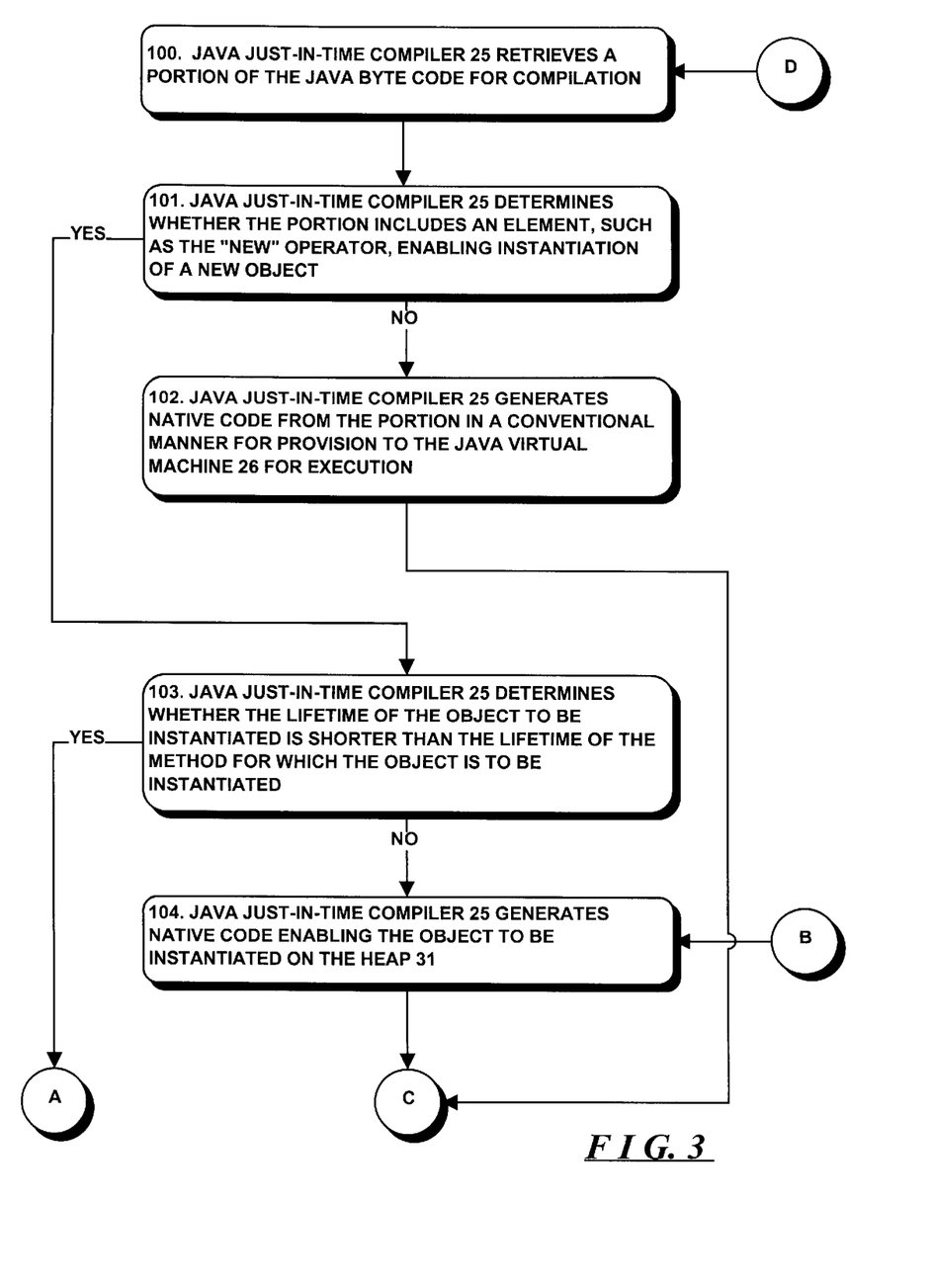
FIG. 3 & 3a is a flow diagram depicting operations performed in connection with the invention.
Figure 3A:
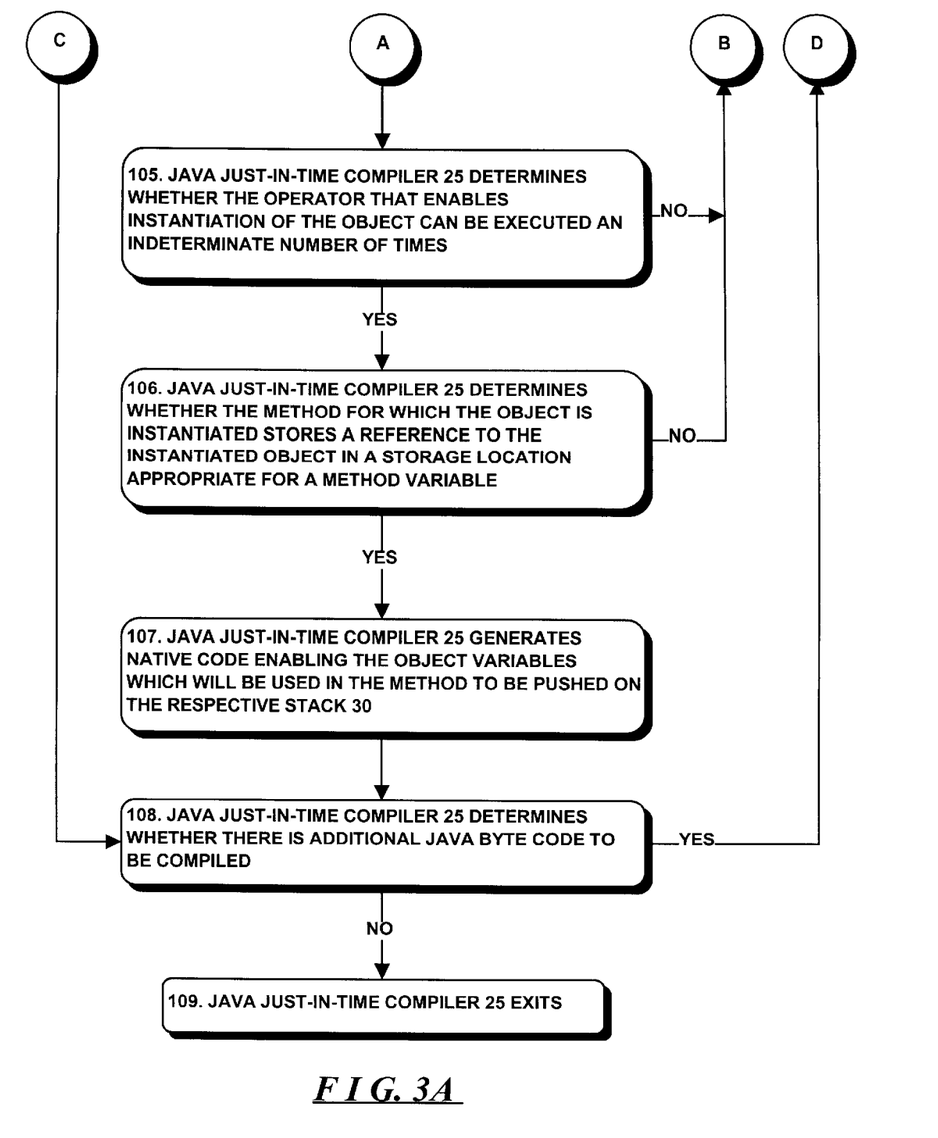

With this background, operations performed by the Java just-in-time compiler 25 in connection with the invention will be described in connection with the flowchart in FIG. 3. With reference to FIG. 3, Java just-in-time compiler 25 retrieves a portion of the Java byte code for compilation (step 100) and determines whether the portion includes an element, such as the "new" operator, enabling instantiation of a new object (step 101). If the Java just-in-time compiler makes a negative determination in step 101, it proceeds to generate native code from the portion in a conventional manner for provision to the Java virtual machine 26 for execution (step 102).

However, if the Java just-in-time compiler makes a positive determination in step 101, it proceeds to determine whether the lifetime of the object to be instantiated is shorter than the lifetime of the method for which the object is to be instantiated (step 103). If the Java just-in-time compiler 25 makes a negative determination in step 103, it proceeds to generate native code enabling the object to be instantiated on the heap 31 (step 104).

Returning to step 103, if the Java just-in-time compiler makes a positive determination in that step, it proceeds to determine whether the operator that enables instantiation of the object can be executed a determinate number of times (step 105). If the Java just-in-time compiler 25 makes a negative determination in step 105, it sequences to step 104 to generate native code enabling the object to be instantiated on the heap 31.

Returning to step 105, if the Java just-in-time compiler makes a positive determination in that step, it proceeds to determine whether the method for which the object is instantiated stores a reference to the instantiated object in a storage location appropriate for a method variable (step 106). If the Java just-in-time compiler 25 makes a negative determination in step 106, it sequences to step 104 to generate native code enabling the object to be instantiated on the heap 31.

Returning to step 106, if the Java just-in-time compiler makes a positive determination in that step, it proceeds to generate native code enabling the object variables which will be used in the method to be pushed on the respective stack 30 (step 107).

Following step 107, or following step 104 if the Java just-in-time compiler 25 generates native code enabling the object to be instantiated on the heap 31, or following step 102, it (that is, the Java just-in-time compiler 25) will determine whether there is additional Java byte code to be compiled (step 108). If the Java just-in-time compiler makes a positive determination in step 108, it can return to step 100 to compile the next Java byte code portion. On the other hand, if the Java just-in-time compiler makes a negative determination in step 108, it may exit (step 109).

The invention provides a number of benefits. In particular, the invention provides an arrangement for automatically and selectively promoting object variables to method fields or method variables in a digital computer system, so that the promoted object variables will be allocated on the appropriate stack, similar to method fields or variables, instead of on the heap. Generally a computer system executes references to variables on the stack faster than references to objects in the heap. In addition, as noted above, when the method returns, the method's stack frame, in which the promoted object variable was allocated, will be automatically eliminated from the stack, thereby reducing the load on the garbage collection mechanism. Furthermore, since the object variables have been promoted to method fields or method variable, when they are referenced the virtual machine does not need to make an implicit NULL object check, which would otherwise be performed if the object were allocated on the heap. Elimination of the implicit NULL object check also reduces the load on the computer system's processor, freeing it to perform other operations.

It will be appreciated that a number of variations and modifications may be made to the invention as described above. For example, although the invention has been described as providing the Java just-in-time compiler 25 to compile the Java byte code 24 to native code for execution by the Java virtual machine 26, it will be appreciated that the Java byte code 24 can be provided directly to the Java virtual machine 26 for execution in a interpretive manner.

In addition, although the invention has been described in connection with the Java programming language, it will be appreciated that the invention can be used in connection with any programming language.

Further, although the Java just-in-time compiler 25 has been described in connection as performing operations in steps 103, 105 and 107 in the order described above in connection with FIG. 3, the operations may be performed in any order. In addition, under particular circumstances it will be that the some of the operations may not need to be performed, or other operations than those described may need to be performed.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A code generator for generating, from code in a program, native code executable by a computer system, the computer system including a memory subsystem including a heap in which objects are stored and a stack in which method variables are stored, the code generator comprising:
   A. a code portion receiver configured to receive a portion of the program code for which the native executable code is to be generated;
   B. an object instantiation detector configured to determine whether the received program code portion includes an operator for enabling instantiation of a new object;
   C. a variable promotion eligibility detector configured to, in response to a positive determination by said object instantiation detector, determine whether the object to be instantiated contains a variable to be used in processing of the received program code portion which can be promoted to a method variable, and
   D. a native code generator configured to, in response to positive determination by said variable promotion eligibility detector, generate native code to enable said variable to be instantiated on the stack.

2. A code generator as defined in claim 1 in which the program includes instructions in Java Byte Code.

3. A code generator as defined in claim 1 in which the native code generator is in the form of a just-in-time compiler.

4. A code generator as defined in claim 1 in which the variable promotion eligibility detector is configured to make a negative determination if the lifetime of the object to be instantiated is shorter than the time during which the program code portion is to be executed.

5. A code generator as defined in claim 1 in which the variable promotion eligibility detector is configured to make a negative determination if the operator that enables instantiation of the object can, during execution of the program code portion, be executed an indeterminate number of times.

6. A code generator as defined in claim 1 in which the variable promotion eligibility detector is configured to make a negative determination if the program code portion stores a reference to the object to be instantiated in a storage location maintained by the computer system except a location in the stack.

7. A code generator as defined in claim 1 in which the native code generator is configured to, in response to a negative determination by said variable promotion eligibility detector, generate native code to enable said object to be instantiated in the heap.

8. A code generation method for generating, from code in a program, native code executable by a computer system, the computer system including a memory subsystem including a heap in which objects are stored and a stack in which method variables are stored, method comprising the steps of:
   A. receiving a portion of the program code for which the native executable code is to be generated;
   B. determining whether the received program code portion includes an operator for enabling instantiation of a new object;
   C. in response to a positive determination by said object instantiation detector, determining whether the object to be instantiated contains a variable to be used in processing of the received program code portion which can be promoted to a method variable, and
   D. in response to positive determination by said variable promotion eligibility detector, generating native code to enable said variable to be instantiated on the stack.

9. A method as defined in claim 8 in which the program includes instructions in Java Byte Code.

10. A method as defined in claim 8 in which the native code generating step includes the step of using a just-in-time compiler.

11. A method as defined in claim 8 in which the variable promotion eligibility detection step includes the step of making a negative determination if the lifetime of the object to be instantiated is shorter than the time during which the program code portion is to be executed.

12. A method as defined in claim 8 in which the variable promotion eligibility detection step includes the step of making a negative determination if the operator that enables instantiation of the object can, during execution of the program code portion, be executed an indeterminate number of times.

13. A method as defined in claim 8 in which the variable promotion eligibility detection step includes the step of making a negative determination if the program code portion stores a reference to the object to be instantiated in a storage location maintained by the computer system except a location in the stack.

14. A method as defined in claim 8 in which the native code generating step includes the step of in response to a negative determination during the variable promotion eligibility detection step, generating native code to enable said object to be instantiated in the heap.

15. A computer program product for use in connection with a computer to provide a code generator for generating, from code in a program, native code executable by a computer system, the computer system including a memory subsystem including a heap in which objects are stored and a stack in which method variables are stored, the computer program product comprising a computer-readable medium having encoded thereon:

A. a code portion receiver module configured to enable the computer to receive a portion of the program code for which the native executable code is to be generated;

B. an object instantiation detector module configured to enable the computer to determine whether the received program code portion includes an operator for enabling instantiation of a new object;

C. a variable promotion eligibility detector module configured to enable the computer to, in response to a positive determination by said object instantiation detector, determine whether the object to be instantiated contains a variable to be used in processing of the received program code portion which can be promoted to a method variable, and D. a native code generator module configured to enable the computer to, in response to positive determination by said variable promotion eligibility detector, generate native code to enable said variable to be instantiated on the stack.

16. A computer program product as defined in claim 15 in which the program includes instructions in Java Byte Code.

17. A computer program product as defined in claim 15 in which the native code generator module is in the form of a just-in-time compiler.

18. A computer program product as defined in claim 15 in which the variable promotion eligibility detector module is configured to enable the computer to make a negative determination if the lifetime of the object to be instantiated is shorter than the time during which the program code portion is to be executed.

19. A computer program product as defined in claim 15 in which the variable promotion eligibility detector module is configured to enable the computer to make a negative determination if the operator that enables instantiation of the object can, during execution of the program code portion, be executed an indeterminate number of times.

20. A computer program product as defined in claim 15 in which the variable promotion eligibility detector module is configured to enable the computer to make a negative determination if the program code portion stores a reference to the object to be instantiated in a storage location maintained by the computer system except a location in the stack.

21. A as defined in claim 15 in which the native code generator module is configured to enable the computer to, in response to a negative determination by said variable promotion eligibility detector module, generate native code to enable said object to be instantiated in the heap.

* * * * *